Patented Nov. 15, 1938

2,137,015

UNITED STATES PATENT OFFICE 2,137,015

LIGHT SENSITIVE PAPER AND METHOD OF TREATING SAME

Clyde A. Crowley and George H. Goodyear, Chicago, Ill., assignors to The Huey Company, Chicago, Ill., a corporation of Illinois No Drawing. Application November 5, 1937, Serial No. 172,962

3 Claims. (Cl. 95—6)

Our invention relates to light-sensitive paper and to a predeveloper therefor, and particularly relates to a novel coating for blue print paper and to a chemical compound adapted for use in the treatment thereof. This application is a continuation in part of our application, Serial No. 139,950, filed April 30, 1937, of which one division, U. S. Patent No. 2,113,423 has been granted.

A developer of the type intended for use in the described relation is disclosed in our U. S. Patent, No. 2,093,421 granted September 21, 1937.

One of the principal problems in the manufacture of blue print paper is that of providing a coating therefor having a known stability or permanency under adverse climatic conditions; in other words, a paper that the manufacturer may distribute with the assurance that it will remain effective for at least a known period, preferably over one year. The desire, and in many cases, the necessity for a certain degree of permanency has been responsible for the general use of a coating compound that is relatively slow in action and which does not produce bright or intense blue color without bleeding and the resultant partial obliteration of the white lines. An object of our invention is, therefore, to provide a perfectly stable coating, one that operates to completely eliminate bleeding in development and one in which an intense blue is present in the final product, and a paper which prints at greater speed than products heretofore known.

The improvement is brought about by the use of a novel coating containing some of the usual components, but in which a substance that acts as a catalyzer to accomplish the needed results is incorporated. The catalytic agents which we have discovered are the nitrate salts.

We do not wish to restrict the use of the catalysts disclosed in this application to sensitized blue print papers which are to be developed exclusively by the process disclosed in our U. S. Patent No. 2,093,421. The inclusion of the catalysts here disclosed has been shown to be definitely desirable in connection with all of the known blue print sensitizing solutions now in use. The use of these catalysts in sensitized papers which are to be developed by our predeveloper, referred to above, are particularly advantageous in those cases where maximum speed and maximum color intensity are essential.

Although the above catalyst may be added to the known types of blue print sensitizing solutions with beneficial results, in practice we prefer to formulate sensitizing solutions particularly adapted to take advantage of the catalytic reaction induced by this substance.

Other satisfactory formulas follow:

1. Potassium oxalate _____ oz__ 12
2. Oxalic acid _____ oz__ 1
3. Cesium mono-nitrate _____ oz__ 6
4. Ferric ammonium oxalate _____ lbs__ 8
5. Potassium ferricyanide _____ oz__ 6½
6. Water to bring the solution to 14.5° Bé.

This formula makes approximately five gallons.

1. Potasisum carbonate _____ oz__ 10
2. Oxalic acid _____ oz__ 10
3. Lithium nitrate _____ oz__ 8
4. Ferric ammonium oxalate _____ lbs__ 10
5. Potassium ferricyanide _____ oz__ 5½
6. Water to bring the solution to 15° Bé.

This formula makes approximately five gallons.

A paper sensitized with the above solutions will not produce good prints when developed in the ordinary manner, due to their low potassium ferricyanide content. If a special predeveloper of the type described in our U. S. Patent No. 2,093,421, and hereinafter described, is not used, the color is not sufficiently deep.

However, when a paper coated with the above types of sensitizers are treated with this special type of predeveloper, an exceptionally fine print will result. For example, the so-coated sheet should be developed in a solution such as the following, and then be washed and treated with an oxidizing solution and rinsed:

1. Potassium carbonate _____ oz__ 10
2. Oxalic acid _____ oz__ 8.5
3. Disodium phosphate (Na₂HPO₄.12H₂O)
   _____ oz__ 22
4. Glucose _____ oz__ 5½
5. Potassium ferrocyanide _____ lbs__ 7
6. Sodium bisulphite _____ oz__ 13½
7. Water to make _____ gals__ 5

A number of other satisfactory predeveloper solutions are disclosed in our said U. S. Patent No. 2,093,421. Another satisfactory solution is as follows:

1. Potassium carbonate _____ oz__ 11
2. Oxalic acid _____ oz__ 9½
3. Disodium phosphate ($Na_2HPO_4.12H_2O$)
   _____ oz__ 24
4. Sucrose _____ oz__ 8
5. Potassium ferrocyanide _____ lbs__ 8
6. Sodium bisulphite _____ oz__ 12
7. Water to make _____ gals__ 5

When the exposed paper is washed in a solution such as above defined, the excess of ferrous iron in the exposed portions reacts with the ferrocyanide of the predeveloping solution to form ferro-ferrocyanide. The concentration of the ferrocyanide ion in the developer is great enough so that no ferrous iron has the opportunity to wash or bleed due to the insolubility of ferrous ferrocyanide.

The exposed paper is then given the customary water wash, bichromate wash and water rinse.

When in use, this predeveloper gives better results if the oxidation of the ferrocyanide is inhibited by the presence of a reducing agent, but this reducing agent must not be strong enough to reduce the iron in the ferric complex on the paper. In practice, sodium bisulphite has been found satisfactory.

A further improvement in the brilliance of the print is achieved by decreasing the particle size of the pigment on the paper. This is done by means of aliphatic polyhydroxyl compounds, aliphatic aldehydes and aliphatic ketones incorporated in the predeveloper which will not react with iron salts to form insoluble reaction products. In practice, various sugars are satisfactory.

In order to obtain good whites with the ferrocyanide predeveloper, it is necessary to buffer the acid concentration rather carefully. Any of the common acid buffers are satisfactory, provided they do not have too powerful oxidizing or reducing properties. In use are mixtures of potassium oxalate, potassium acid oxalate and oxalic acid or mixtures of sodium acid phosphate and oxalic acid.

It will be noted that the catalyst constitutes a small but definite component in the sensitizers disclosed.

Although the specific chemical or chemical-physical mechanism is not understood, it is believed that the action is catalytic. This catalyst may be incorporated with the known type of sensitizing solution as follows:

1. Cesium mono-nitrate _____ g__ 3
2. Citric acid _____ g__ 6
3. Potassium oxalate _____ g__ 6
4. Ferric ammonium oxalate _____ g__ 39
5. Potassium ferricyanide _____ g__ 9½
6. Water to make _____ cc__ 250

Also;

1. Lithium nitrate _____ g__ 3
2. Potassium oxalate _____ g__ 6
3. Citric acid _____ g__ 6
4. Ferric ammonium oxalate _____ g__ 40
5. Potassium ferricyanide _____ g__ 8
6. Water to make _____ cc__ 250

This formula is for development in the customary manner involving washing and treatment with an oxidizing agent.

In all cases, the inclusion of the catalyst improves the speed and the blue color, improves the ease of washing the paper and stabilizes the sensitizing solution against deterioration during storage, as well as stabilizing the paper thus coated against rapid spoiling under normal or adverse atmospheric conditions.

The possible actions of the catalysts above disclosed in effecting the results described have been the subject of extensive laboratory study aimed at determining the probable mechanism by which these substances produce the desirable effects described. Observations as made, in our opinion, restrict the action of the substances claimed to the field of catalysts.

Table

| Alkali nitrate added | Molecular weight | Grams dissolved in 250 cc. | pH of sensitizing solution | pH of water solution |
|---|---|---|---|---|
| 1. Ammonium nitrate | 80.05 | 3 | 5.22 | 5.4 |
| 2. Lithium nitrate | 68.95 | 2584 | 5.17 | 6.7 |
| 3. Potassium nitrate | 101.11 | 3.8 | 5.22 | 5.9 |
| 4. Sodium nitrate | 85.01 | 3.19 | 5.22 | 6.25 |
| 5. Control—no addition | | 0 | 5.20 | 5.9 |

The large effect of change of concentration of potassium ferricyanide upon the speed of blue print paper may be explained by filtering on the light rays or more probably by chemical action which ties the iron in a more stable complex. A somewhat analogous situation exists with respect to the presence of an excess of oxalate.

Probably in this case it may be an exchange of (CN) and ($C_2O_4$) groups in the complex ions. The following is one of several possible reactions.

$$2Fe(C_2O_4)_3^{\equiv} + Fe(CN)_6^{\equiv} \longrightarrow 3(Fe(CN)_2(C_2O_4)_2)^{\equiv}$$

This replacement of (CN) groups by other groups is not uncommon as NO, CO, $SO_3$, $NO_2$, $H_2O$, $NH_3$, $AsO_2$, are known to replace one CN group in either the ferro- or ferricyanides to form complex pentacyanides.

We were unable to produce evidence showing complex ion formation by means of density changes in the solution. It is to be observed that this evidence does not prove that complex ion formation did not occur.

Investigations have shown that the following conclusions are pertinent:

1. That either no complex ions are formed, or if they are formed they are very highly ionized and very mobile so that the conductivity of the resulting solution is the same as the sum of the conductivities of the component substances, or, 2. There is an equilibrium condition set up between the original substances and the complex ions. In this equilibrium there is only a small amount of the complex present at any time but it is this complex which is responsible for the superior blue print paper produced when catalysts of the type disclosed are included in the sensitizer formulation. As the complex is used it is rapidly reformed so that equilibrium is always maintained.

We have, therefore, concluded that the action of the substances disclosed must be catalytic and that they probably function by one or more of the last two mechanisms discussed.

We claim:

1. The method of making blue prints which consists in coating a paper with a solution comprising a light-reducible ferric complex, a ferricyanide salt and a nitrate salt of an alkali metal of the first group of the periodic table, then exposing parts of said paper to light and then developing said paper.

2. The method of making blue prints which consists in coating a paper with a solution comprising a light-reducible ferric complex, a ferricyanide salt and a nitrate salt of an alkali metal of the first group of the periodic table, then exposing parts of said paper to light and then treating said paper in a predeveloper comprising an acid reacting water solution of a ferrocyanide.

3. A coating for blue print paper comprising a light-reducible ferric complex, a ferricyanide salt and a nitrate salt of an alkali metal of the first group of the periodic table.

CLYDE A. CROWLEY.
GEORGE H. GOODYEAR.